UNITED STATES PATENT OFFICE.

PHILO MARSH, OF SOUTH ADAMS, MASSACHUSETTS, ASSIGNOR TO MARSH & HOWLAND.

IMPROVEMENT IN TREATING OILS.

Specification forming part of Letters Patent No. 14,042, dated January 1, 1856.

*To all whom it may concern:*

Be it known that I, PHILO MARSH, of South Adams, in the county of Berkshire and State of Massachusetts, have invented or discovered a new or Improved Method of Treating Whale or Fish Oil in order to adapt it to lubricating or other useful purposes, such oil after being so treated, being termed by me "defecated oil;" and I do hereby declare that the following is a description of the same.

The improvement which I have made in treating whale or fish oil renders it fit for lubricating machinery-bearings, as a fuel for lamps, or for various other useful purposes, and has for its object not only to effect the removal from the oil of naturally existing animal matter, which has an adhesive pitch like character when separated therefrom, but to so treat the oil as to prevent any subsequent or important change in it by after exposure to the air.

My experiments prove that whale or fish oil as sold in the market has characteristics similar to the drying or siccative oils, as by exposure to air it contracts on its surface a wrinkled elastic film. This film has been called "gum" or "gluten;" but I find it has few of the qualities of either of these well-known chemical bodies, and its mode of formation shows that it cannot be either gum or gluten. It appears to form gradually and to change the nature of the oil in consequence of the presence in the oil of a kind of changing substance like a ferment.

My process has for its object the complete removal of this changing substance or ferment, as well as any proceeding from it, the same being so as to adapt the oil for diminishing friction on heavy bearings with slow motions, or light bearings running with quick motion, or for other useful or practical purposes.

To enable those skilled in the art to apply my improvement in purifying oil, I will proceed to describe my improved process.

The oil is to be introduced into wooden or lead-lined vessels, provided not only with a leaden coil for heating their contents by steam, but with a leaden pipe descending to the bottom, and having a rose-jet for washing by steam. For every one hundred gallons of oil to be treated I add thereto about fifty gallons of crude pyroligneous acid as obtained by the destructive distillation of wood. Next I admit steam into the coil and boil the mixture of oil and acid for about two hours, leaving the warm mixture after shutting off the steam until the acid fluid has collected below the oil. This having been accomplished, I withdraw the acid and save it for any of the ordinary uses. Another portion of about fifty gallons of the crude acid is next to be added to the oil, and the boiling repeated for two hours, or thereabout, after which the acid fluid should be allowed to separate from the oil, and should be entirely removed from it. Next the pipe for injecting steam should be opened, and steam suffered to slowly enter the oil until the temperature of the oil is raised near to the boiling-point of water, when a rapid current of the steam should be allowed to blow up and thoroughly wash the oil from every trace of the acid and soluble matter remaining. I sometimes repeat this washing by steam, allowing any condensed water to fall to the bottom of the vessel, and subsequently removing such water by a draw-off cock. The oil which has been thus washed by steam will still contain water diffused through it, such rendering it turbid. To remove this a gentle heat, by admitting steam or heat into the coil, may be employed until the warm oil becomes perfectly bright and clear, when it is ready for use as a defecated oil. When more convenient I conduct these operations in a metal kettle heated by a steam-jacket.

I am aware that acids have heretofore been used for clarifying oils; but my process does not rest on the use of acids alone; nor do I claim such. Pyroligneous acid is used because it contains, besides acetic acid, creosote, wood-spirit, pyretin, and a smoke-essence, which are the bodies chiefly influential in producing the clarification in my process, and as the acetic acid in the pyroligneous acid is not consumed, but is available for the usual purposes, the crude pyroligneous acid becomes the most economical source of the pyrogenic compounds required in my process.

What I claim for the purpose of defecating oil is—

The employment, in manner substantially as above described, of the pyrogenic constituents of crude pyroligneous acid, except the acetic acid.

In testimony whereof I have hereunto set my signature this 26th day of September, A. D. 1855.

PHILO MARSH.

Witnesses:
R. H. EDDY,
F. P. HALE, Jr.